(12) United States Patent
Jang et al.

(10) Patent No.: US 10,071,324 B2
(45) Date of Patent: Sep. 11, 2018

(54) BACKWASHING FLUID DISCHARGE APPARATUS AND FILTER UNIT

(71) Applicant: HYUNDAI HEAVY INDUSTRIES CO., LTD., Ulsan (KR)

(72) Inventors: Won Taek Jang, Ulsan (KR); Yang Gyu Kim, Ulsan (KR); Kyung Nam Chung, Ulsan (KR); Gil Ju Jeong, Yangsan-si (KR); Tae Jin Rhee, Yongin-si (KR); Ki Hoon Han, Ulsan (KR); Sung-Hwan Yoon, Busan (KR); Hyun Woo Lee, Busan (KR); Seunghye Oh, Seoul (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 189 days.

(21) Appl. No.: 15/032,618

(22) PCT Filed: Oct. 24, 2014

(86) PCT No.: PCT/KR2014/010055
§ 371 (c)(1),
(2) Date: Apr. 27, 2016

(87) PCT Pub. No.: WO2015/064967
PCT Pub. Date: May 7, 2015

(65) Prior Publication Data
US 2016/0243472 A1 Aug. 25, 2016

(30) Foreign Application Priority Data

Oct. 29, 2013 (KR) .......................... 10-2013-0128973
Nov. 21, 2013 (KR) .......................... 10-2013-0142540

(51) Int. Cl.
*B01D 29/66* (2006.01)
*B01D 29/52* (2006.01)
(Continued)

(52) U.S. Cl.
CPC ............. *B01D 29/66* (2013.01); *B01D 29/13* (2013.01); *B01D 29/52* (2013.01); *B01D 29/668* (2013.01);
(Continued)

(58) Field of Classification Search
None
See application file for complete search history.

(56) References Cited

U.S. PATENT DOCUMENTS 3,519,560 A 7/1970 Taylor
6,439,273 B1 8/2002 Kruger et al.
(Continued)

FOREIGN PATENT DOCUMENTS

EP 2767316 A1 8/2014
JP 54098671 A 3/1979
(Continued)

OTHER PUBLICATIONS

"Filtration Apparatus"; Bibliographic data of JP2013091046 (A); May 16, 2013; http://worldwide.espacenet.com.
(Continued)

*Primary Examiner* — Chester T Barry
(74) *Attorney, Agent, or Firm* — Andrew D. Fortney; Central California IP Group, P.C.

(57) ABSTRACT

Disclosed are a backwashing fluid discharge apparatus and a filter unit. The backwashing fluid discharge apparatus includes a plurality of drainage members installed so as to be located within a filter member in order to discharge backwash fluid moved to an inside of the filter member, and the drainage members have different diameters so as to form a plurality of inlet holes for introduction of the backwash fluid, and the drainage members have different lengths such that the inlet holes are located at different heights.

19 Claims, 12 Drawing Sheets

(51) Int. Cl.
  *B01D 29/92*  (2006.01)
  *B01D 29/13*  (2006.01)
(52) U.S. Cl.
  CPC ...... *B01D 29/925* (2013.01); *B01D 2201/316* (2013.01)

(56) References Cited

U.S. PATENT DOCUMENTS

| | | | |
|---|---|---|---|
| 7,691,274 B2* | 4/2010 | Wnuk | B01D 29/52 210/136 |
| 2008/0067119 A1 | 3/2008 | Wnuk et al. | |
| 2012/0125834 A1 | 5/2012 | Gessner et al. | |
| 2014/0238911 A1 | 8/2014 | Lee et al. | |

FOREIGN PATENT DOCUMENTS

| | | | |
|---|---|---|---|
| JP | 1-167312 | * | 11/1989 |
| JP | 06004890 Y | | 2/1994 |
| JP | 2013091046 A | | 5/2013 |
| KR | 19950013555 A | | 6/1995 |
| KR | 100769834 B1 | | 10/2007 |
| KR | 20070121734 A | | 12/2007 |
| KR | 20110012211 A | | 2/2011 |
| KR | 20110132372 A | | 12/2011 |
| KR | 20120005812 A | | 1/2012 |
| KR | 20120136179 A | | 12/2012 |
| KR | 10-2014-0052137 A | | 5/2014 |
| KR | 1020140095627 A | | 8/2014 |
| WO | 2013054966 A1 | | 4/2013 |
| WO | 2014080329 A1 | | 5/2014 |

OTHER PUBLICATIONS

Abstract of JP06-004890 (Y); Feb. 9, 1994; 2 pgs.; https://www4.j-platpat.inpit.go.jp.

Byung Keun Park; "Auto Cleaning Filter System"; Bibliographic data of KR20120005812 (A); Jan. 17, 2012; http://worldwide.espacenet.com.

Stefan Beyer et al.; "Filter Device"; Bibliographic data of KR20110132372 (A); Dec. 7, 2011; 2 pgs.; http://worldwide.espacenet.com.

Mun Hyun Kim et al.; "Apparatus for Removing Impurities From a Centrifugal Filter System"; Bibliographic data of KR20110012211 (A); Feb. 9, 2011; http://worldwide.espacenet.com.

Ralf Wnuk et al.; "Filter Installation and Method for Operating One Such Filter Installation"; Bibliographic data of KR20070121734 (A); Dec. 27, 2007; http://worldwide.espacenet.com.

Yun So Bak et al: Filtering and Ozone Treating Type Ballast Water Treatment System Comprising Filtering Equipment and Ozone Generating Equipment and Method for Operating the Same; Abstract of KR100769834 (B1); Oct. 18, 2007; http://kipo.go.kr.

Ruediger Lennartz et al.; "Backwash Filter"; Bibliographic data of EP0656223 (A1); Jun. 7, 1995; http://worldwide.espacenet.com.

Extended European Search Report dated Sep. 27, 2017; European Patent Application No. 148583933; 13 pgs., European Patent Office, Munich, Germany.

Tae Jin Rhee et al.; "Filter for Ballast Water"; Abstract of KR1020140095627 A; Apr. 8, 2014; http://kpa.kipris.or.kr.

Shigeru Morokawa; "Electronic Watch"; Abstract of JP54098671 A; Mar. 8, 1979; https://www4.j-platpat.inpit.go.jp.

Won Taek Jang et al.; "Automatic Backwash Filter Apparatus"; Abstract of KR10-2014-0052137 (A); http://kpa.kipris.or.kr.

Byung Keun Park; "Auto Cleaning Filter System"; Bibliographic Data of KR20120136179 (A); http://worldwide.espacenet.com.

Partial Supplementary European Search Report dated May 4, 2017; International Application No. PCT/KR2014010055; 12 pages; European Patent Office, Munich, Germany.

International Search Report; International Searching Authority/KR dated Jan. 26, 2015; International Application No. PCT/KR2014/010055; 5 pages; International Searching Authority/Korean Intellectual Property Office; Daejeon, Republic of Korea.

* cited by examiner

【Fig. 1】
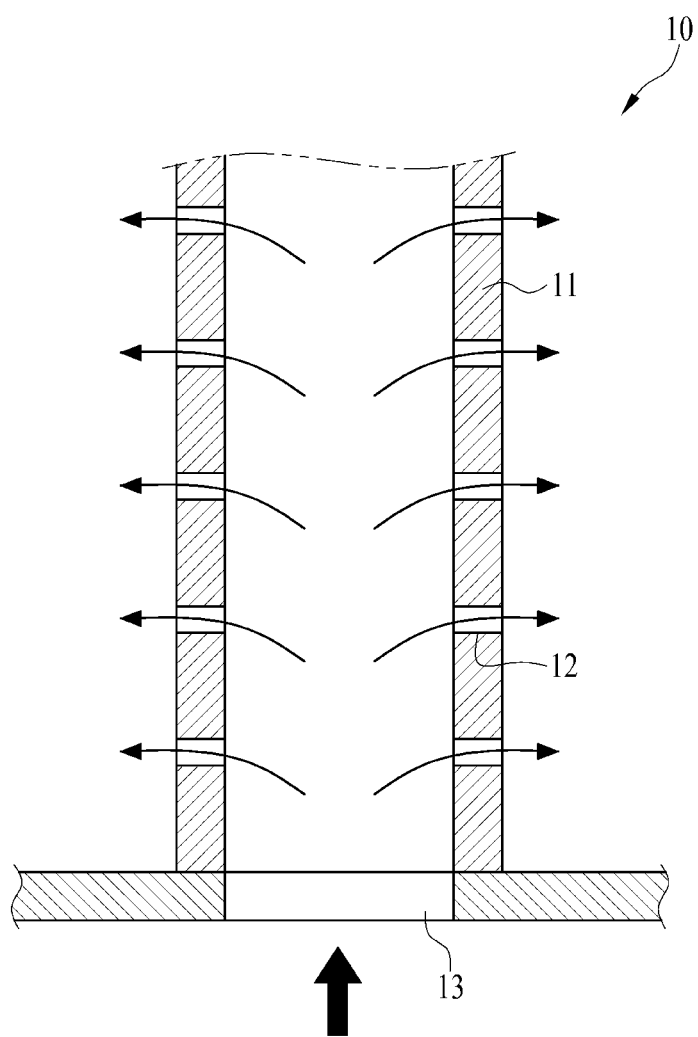

【Fig. 2】
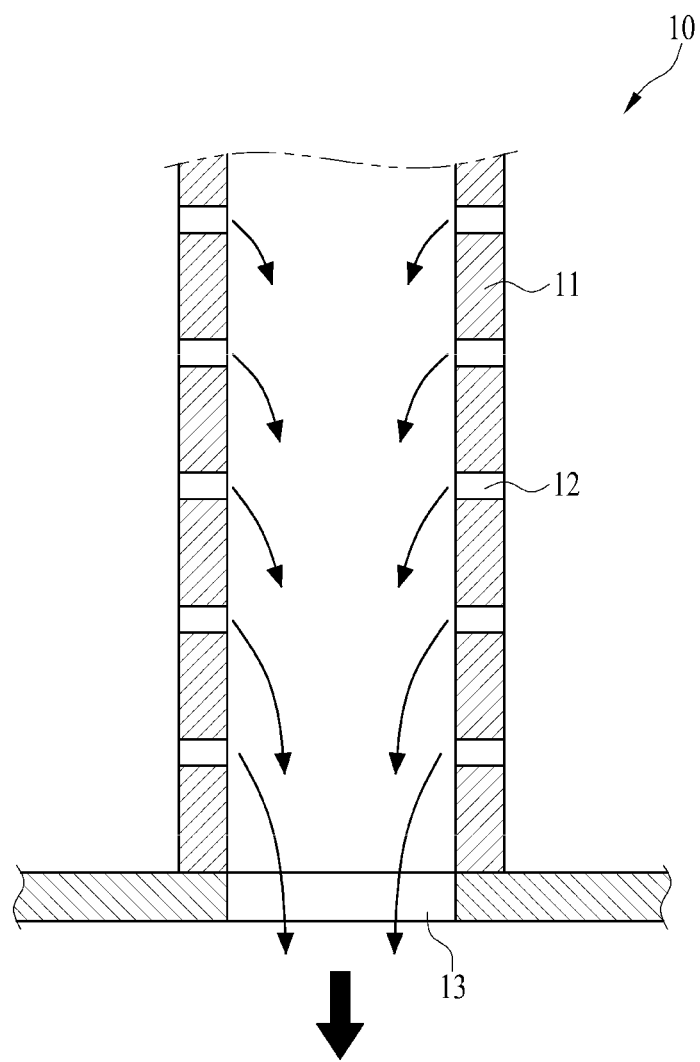

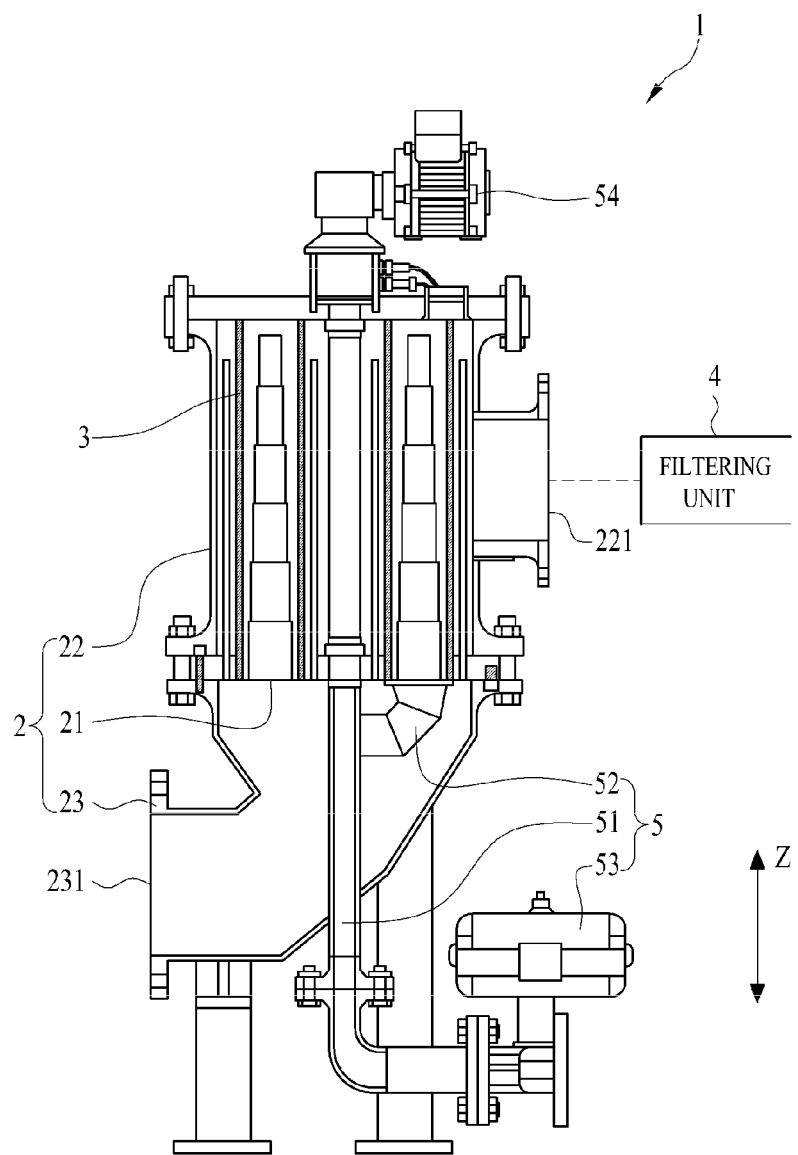
【Fig. 3】

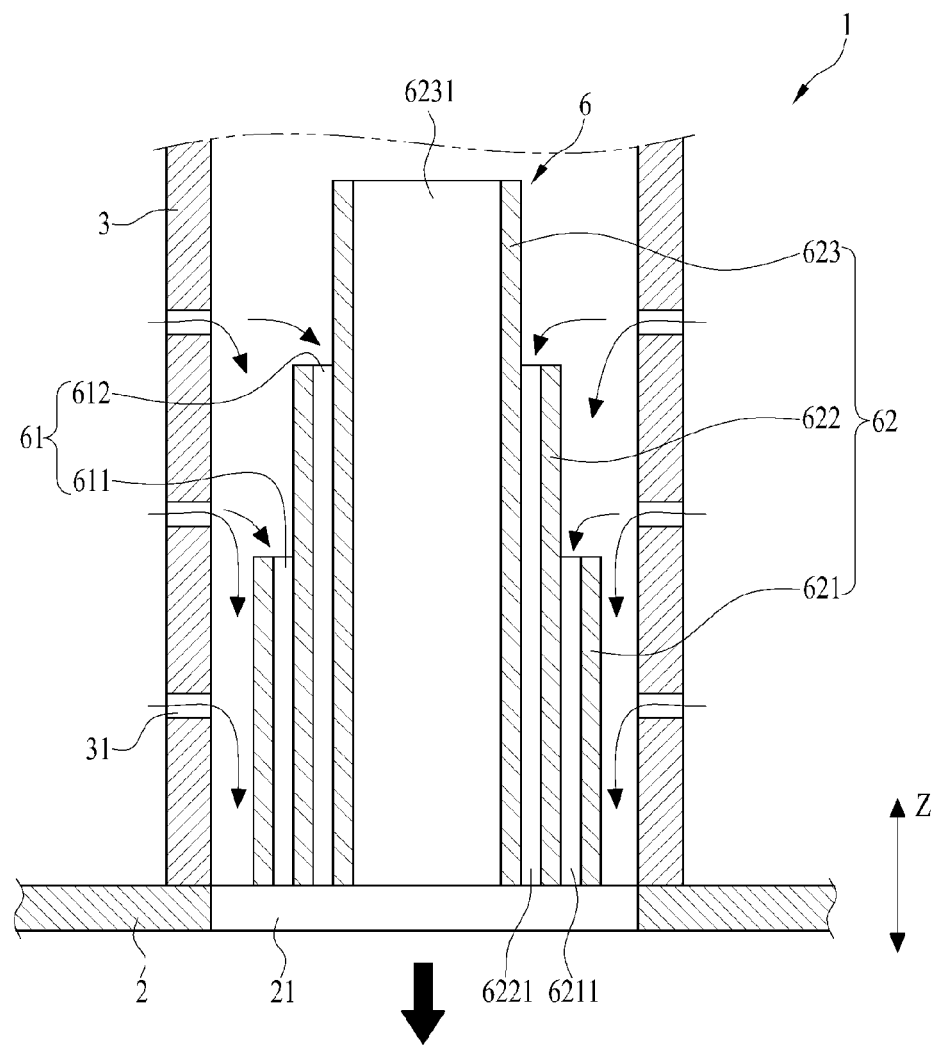
[Fig. 4]

[Fig. 5]
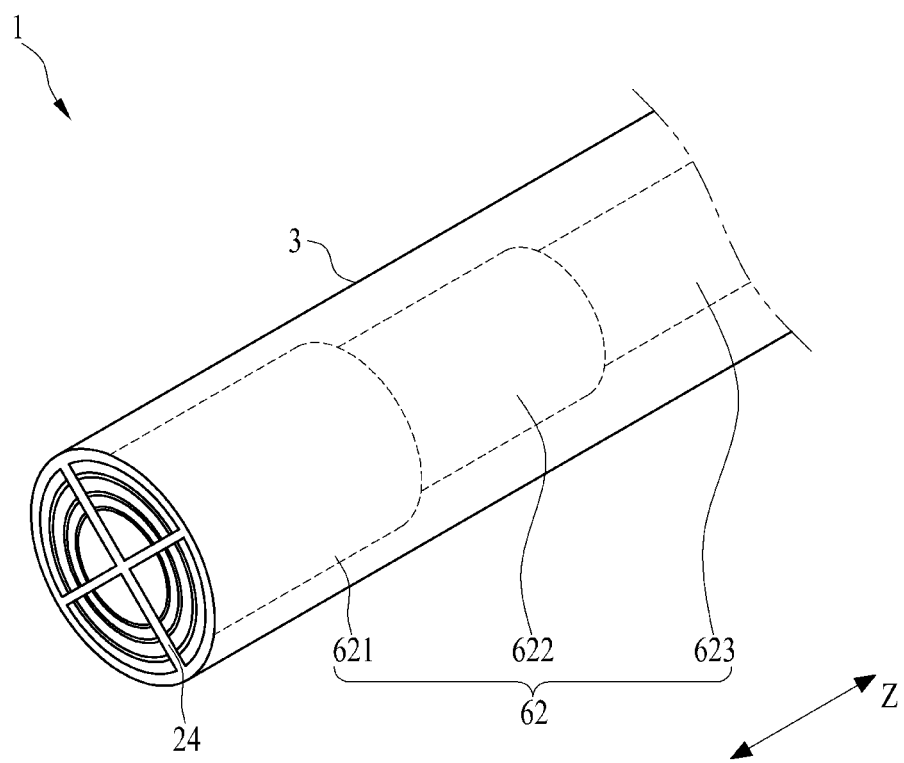

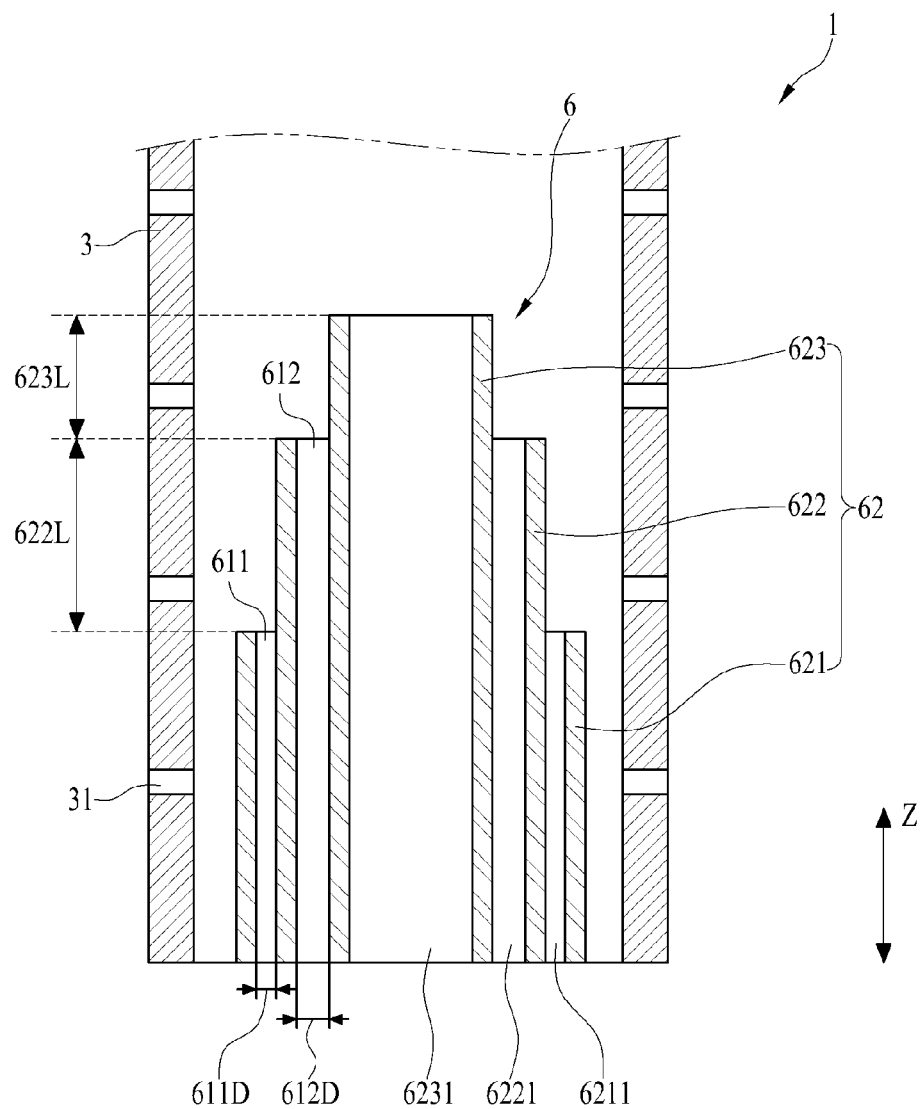
[Fig. 6]

【Fig. 7】
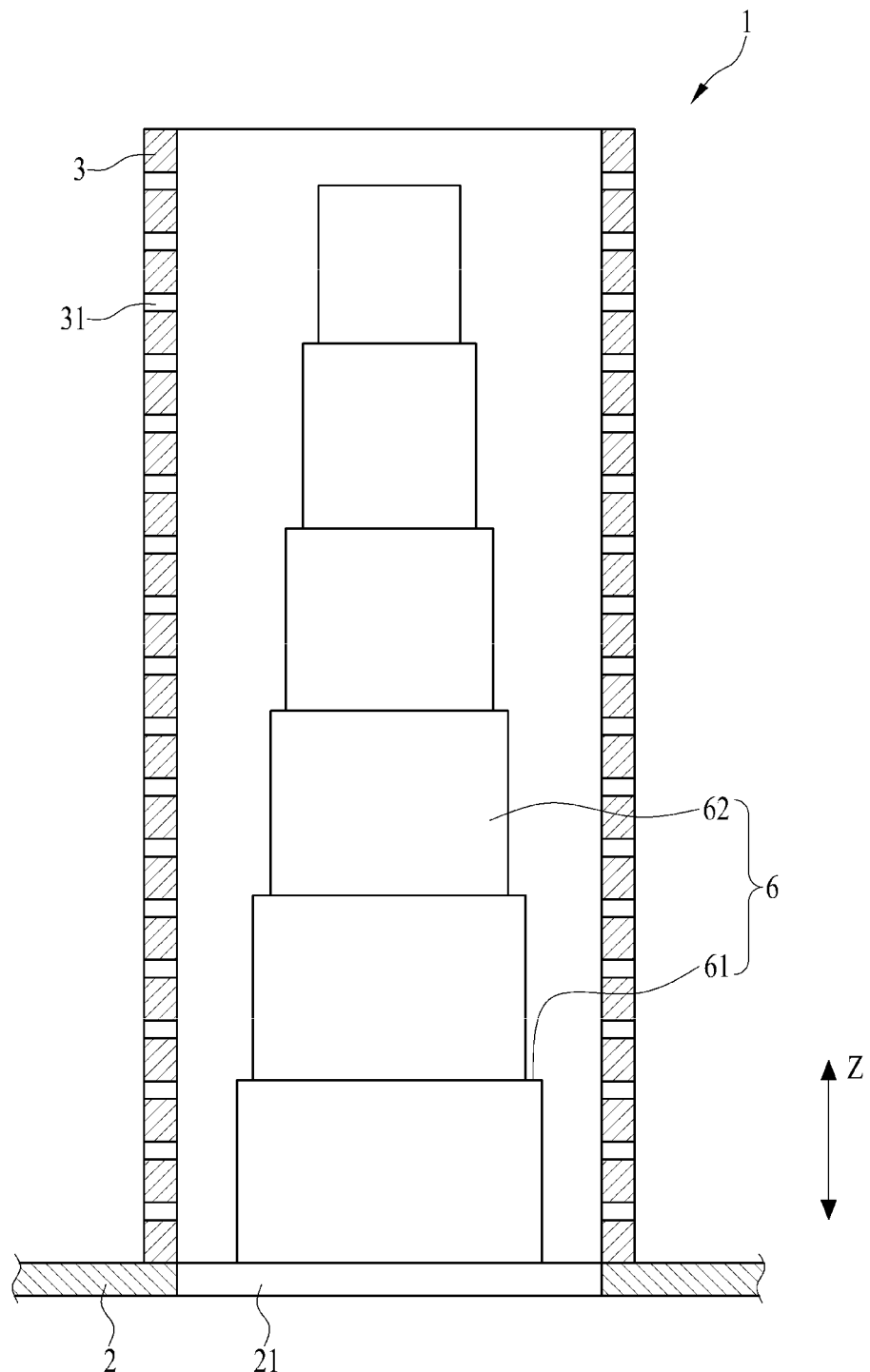

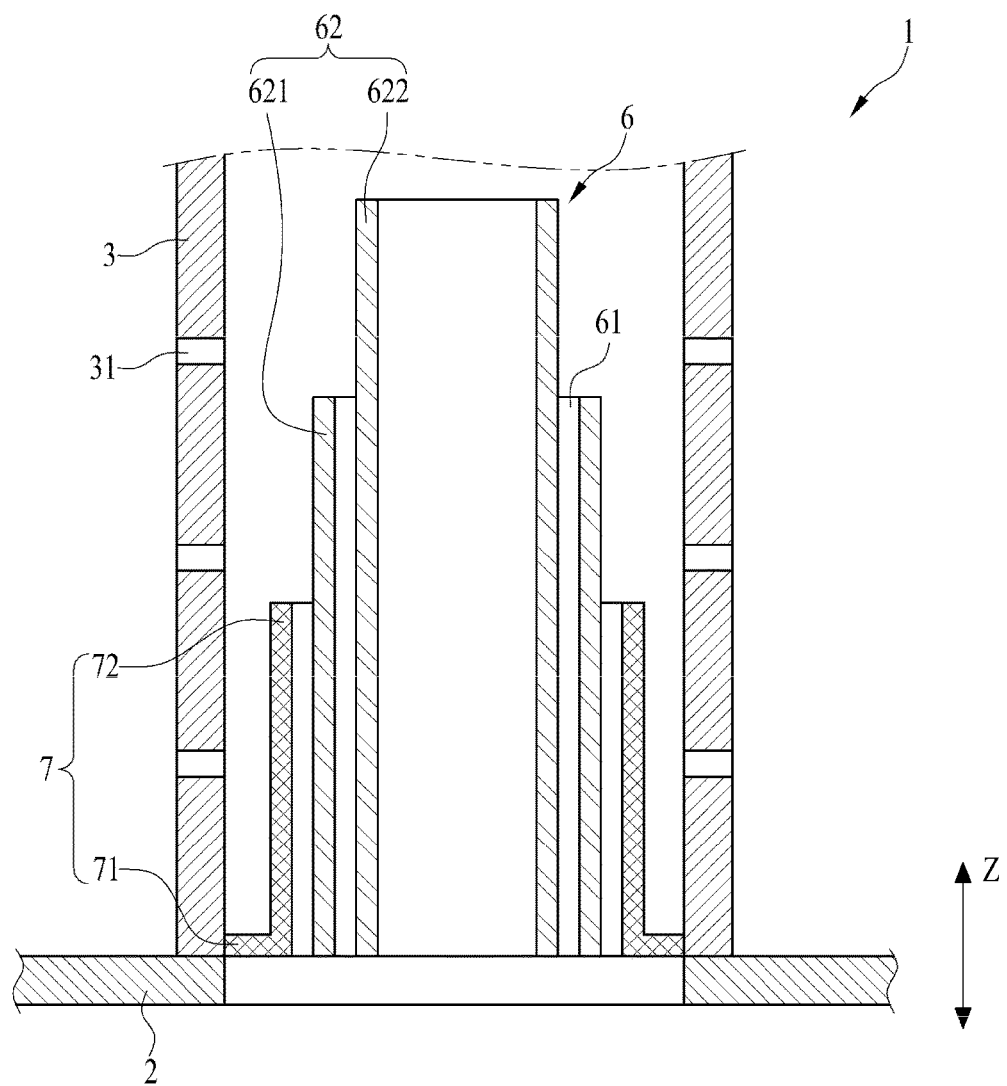
[Fig. 8]

[Fig. 9]
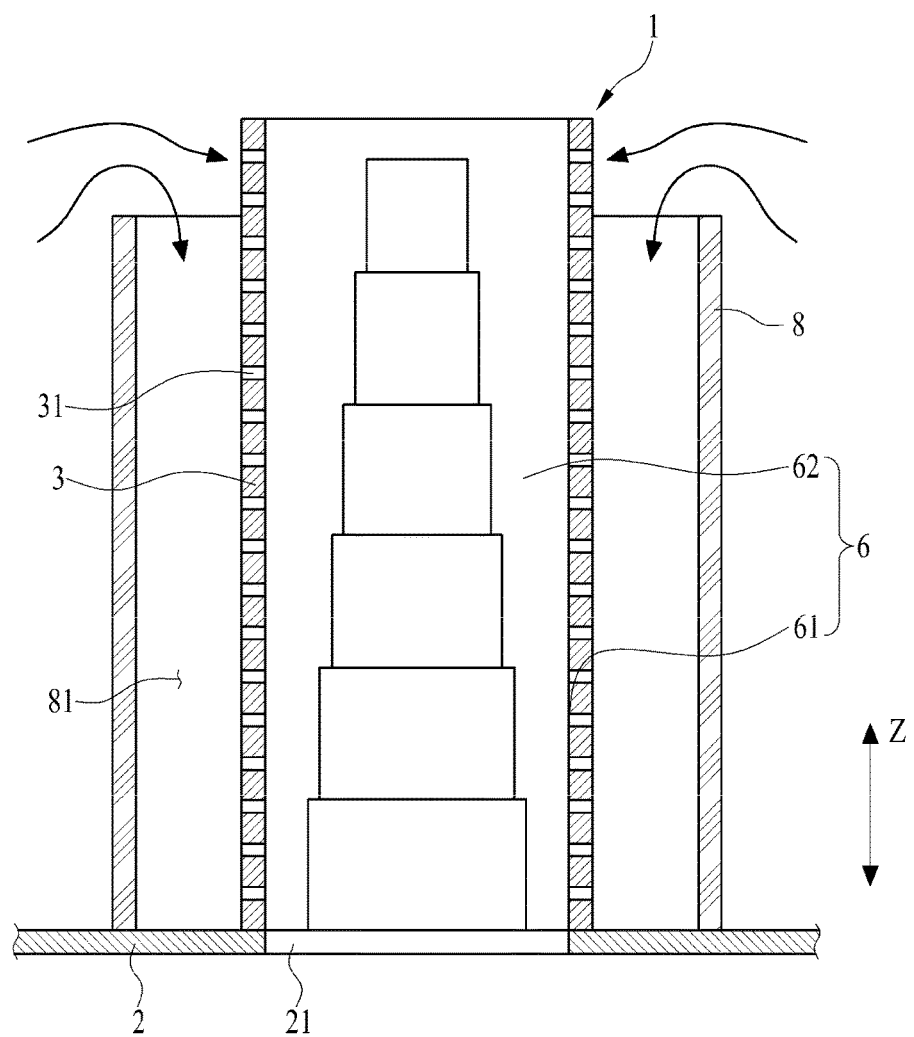

[Fig. 10]
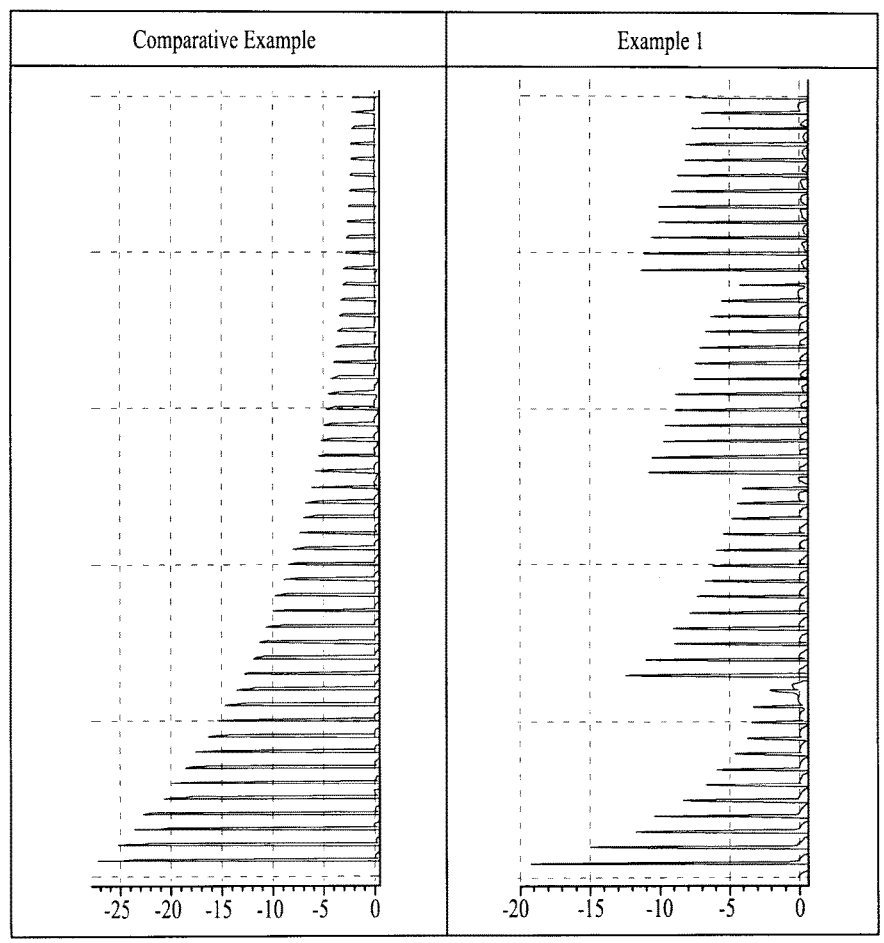

[Fig. 11]
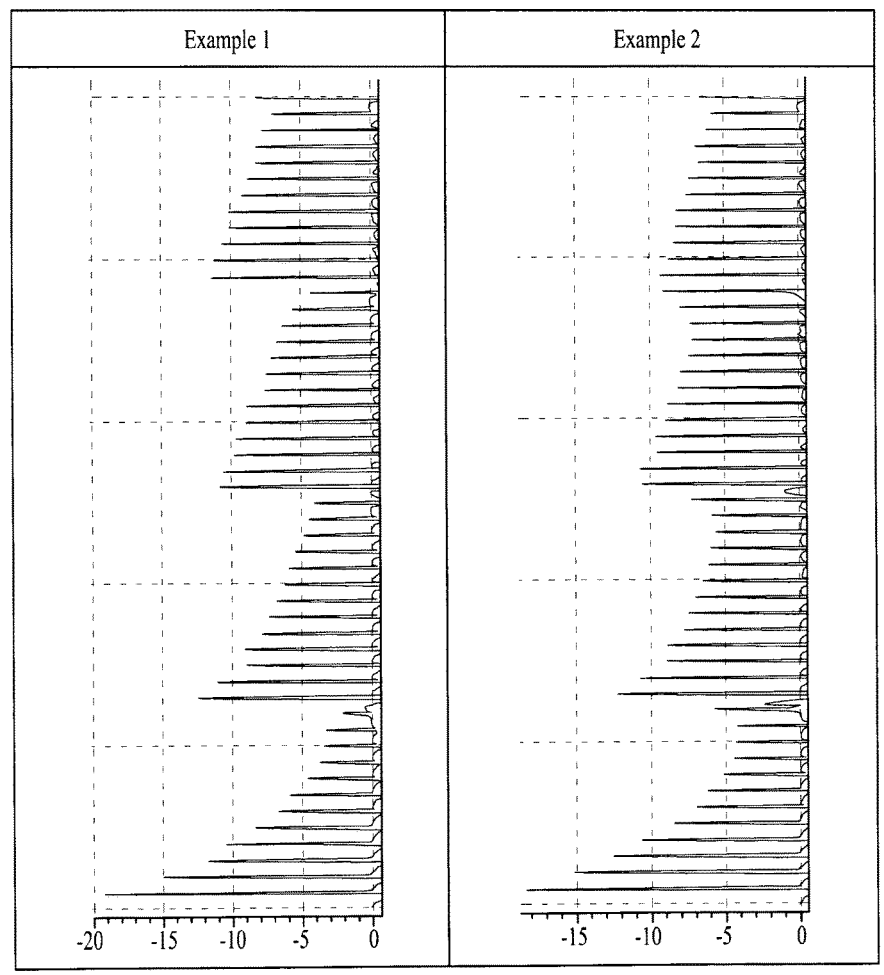

[Fig. 12]
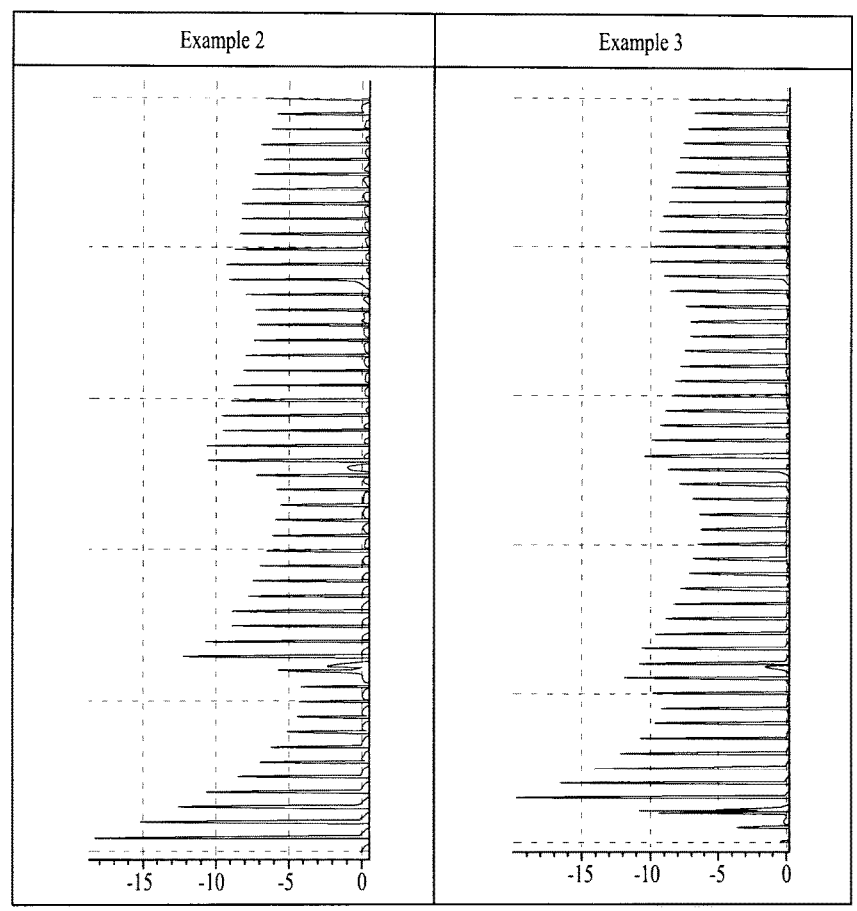

BACKWASHING FLUID DISCHARGE APPARATUS AND FILTER UNIT

TECHNICAL FIELD

The present invention relates to a filter unit used to filter foreign substances present in a fluid.

BACKGROUND ART

In general, a filter unit performs a filtering process of removing foreign substances from a fluid supplied to, for example, a ship by filtering the foreign substances present in the fluid.

For example, when the filter unit is installed in the ship, the filter unit may perform a filtering process of removing foreign substances from a fluid supplied to the ship, in order to allow ballast water to be stored in the ship after foreign substances have been removed therefrom. The ballast water functions to adjust the balance of the ship and the discharge of water from the ship as the amount of ballast water stored in a ballast tank, which is installed in the ship, is adjusted according to the amount of cargo loaded in the ship. The process of adjusting the amount of ballast water stored in the ballast tank may be performed by discharging the ballast water stored in the ballast tank to the outside of the ship or by supplying a fluid, such as seawater or fresh water, outside the ship to the ballast tank.

In this process, the filter unit installed in the ship removes foreign substances, such as inorganic matters including gravels, sand, mud, etc., organisms including fish and shellfish, crustacean, plankton, etc., and organic matters, from the fluid supplied to the ballast tank, thereby preventing the occurrence of damages, such as the disturbance of ecosystems and the distribution of harmful pathogens via the ballast water. In connection with this, the background technology of the present invention is disclosed in Korean Patent Registration Publication No. 10-0769834 (published on Oct. 24, 2007).

FIG. 1 is a conceptual view illustrating the implementation of a filtering process by a conventional filter unit, and FIG. 2 is a conceptual view illustrating the implementation of a backwash process by the conventional filter unit.

As illustrated in FIG. 1, the conventional filter unit 10 performs a filtering process on a fluid by moving the fluid so as to pass through passage holes 12 formed in a filter member 11. After being supplied into the filter member 11 through a penetration opening 13, the fluid moves from the inside of the filter member 11 to the outside of the filter member 11 through the passage holes 12 while moving from the bottom side to the top side of the filter member 11. The passage holes 12 have a smaller size than the size of the foreign substances to be removed from the fluid. Thereby, while the fluid moves from the inside of the filter member 11 to the outside of the filter member 11, the foreign substances mixed in the fluid cannot pass through the passage holes 12, thereby being removed from the fluid.

The foreign substances, which remain inside the filter member 11 due to the implementation of the filtering process described above, are adhered to the inner surface of the filter member 11, thus gradually clogging the passage holes 12. Due to this, the conventional filter unit 10 suffers from a gradual reduction in the flow rate of the fluid passing through the filter member 11, thus causing deterioration in function with regard to the filtering process.

To prevent the problem described above, the conventional filter unit 10 performs a backwash process on the filter member 11 as illustrated in FIG. 2. In this case, the fluid moves from the outside of the filter member 11 to the inside of the filter member 11, thus causing the foreign substances adhered to the inner surface of the filter member 11 to be separated from the filter member 11. That is, the fluid separates the foreign substances from the filter member 11 by moving in the direction opposite to the direction in which the fluid moves during the implementation of the filtering process. The foreign substances separated from the filter member 11 move along with the fluid as the fluid moves from the top side to the bottom side of the filter member 11, thereby being discharged outward through the penetration opening 13.

Here, when the conventional filter unit 10 performs the backwash process, the portion of the filter member 11 that is more distant from the penetration opening 13 exerts a smaller suction force, which is required to move the fluid from the outside of the filter member 11 to the inside of the filter member 11. As such, the fluid outside the filter member 11 moves into the filter member 11 at a lower flow rate at the portion of the filter member 11 that is more distant from the penetration opening 13. That is, the efficiency of backwashing is deteriorated with a decreasing distance to the top side of the filter member 11. Therefore, after the conventional filter unit 10 performs the backwash process, the foreign substances remain adhered to the upper portion of the filter member 11, and the passage holes 12 are clogged by the foreign substances, resulting in deterioration in filtering functionality.

DISCLOSURE

Technical Problem

Therefore, the present invention has been made in view of the above problems, and it is an object of the present invention to provide a backwashing fluid discharge apparatus and a filter unit, which may mitigate a decrease in filtering functionality due to foreign substances remaining after a backwash process.

Technical Solution

Io accomplish the above and other objects, the present invention may include the following configurations.

In accordance with one aspect of the present invention, a backwashing fluid discharge apparatus may include a plurality of drainage members installed so as to be located within a filter member in order to discharge backwash fluid moved to an inside of the filter member. The drainage members may have different diameters so as to form a plurality of inlet holes for introduction of the backwash fluid. The drainage members may have different lengths such that the inlet holes are located at different heights.

In accordance with another aspect of the present invention, a filter unit may include a filter member for removing a foreign substance from a fluid, a main body to which the filter member is installed, a backwash unit coupled to the main body for moving the fluid from an outside of the filter member to an inside of the filter member in order to separate the foreign substance from the filter member, and a drainage device coupled to the main body so as to be located within the filter member. The drainage device may include a plurality of drainage members coupled to the main body in order to discharge the backwash fluid moved from the outside of the filter member to the inside of the filter member. The drainage members may have different diameters and are spaced apart from one another so as to form a plurality of inlet holes for introduction of the backwash fluid. The drainage members may have different lengths so that the inlet holes are located at different heights.

In accordance with a further aspect of the present invention, a filter unit may includes a filter member for removing a foreign substance from a fluid, a main body in which the filter member is installed, a filtering unit coupled to the main body for moving the fluid from an inside of the filter member to an outside of the filter member in order to remove the foreign substance from the fluid, a backwash unit coupled to the main body for moving the fluid from the outside of the filter member to the inside of the filter member in order to separate the foreign substance from the filter member, and a drainage device coupled to the main body so as to be located within the filter member. The drainage device may include a plurality of inlet holes for introduction of backwash fluid, the inlet holes being configured to allow the backwash fluid, moved from the outside of the filter member to the inside of the filter member, to be discharged to the backwash unit by passing through a penetration opening formed in the main body. The inlet holes may be formed so as to be located at different heights in order to enable introduction of the backwash fluid at the different heights.

Advantageous Effect

As is apparent from the above description, the present invention has the following effects.

The present invention may increase the efficiency of backwashing of a filter member and may achieve increased filtering performance as a result of increasing the uniformity of suction force required to perform a backwash process on the filter member as well as the uniformity of the flow rate of the corresponding fluid.

The present invention may reduce replacement costs and management costs for the filter member by extending the maintenance and repair period for the implementation of, for example, replacement of the filter member.

The present invention may reduce the flow rate of the fluid consumed to perform the backwash process on the filter member and the time taken to perform the backwash process on the filter member.

DESCRIPTION OF DRAWINGS

FIG. 1 is a conceptual view illustrating the implementation of a filtering process by a conventional filter unit;

FIG. 2 is a conceptual view illustrating the implementation of a backwash process by the conventional filter unit;

FIG. 3 is a schematic side sectional view illustrating a filter unit in accordance with the present invention;

FIG. 4 is a schematic side sectional view of a drainage device in accordance with the present invention;

FIG. 5 is a schematic perspective view illustrating a drainage device and a filter member in accordance with the present invention;

FIGS. 6 to 8 are schematic side sectional views illustrating a drainage device in accordance with alternative embodiments of the present invention; and FIG. 9 is a schematic side sectional view illustrating a filter unit in accordance with an alternative embodiment of the present invention.

FIG. 10 shows graphs comparing results of measurements of a filter membrane with and without an exemplary drainage device.

FIG. 11 show graphs comparing results of an exemplary filter unit depending on whether the drainage device was in partial contact with or spaced apart from the filter membrane.

FIG. 12 show graphs comparing results of an exemplary filter unit with and without an exemplary blocking unit.

MODE FOR INVENTION

Hereinafter, the embodiments of a filter unit in accordance with the present invention will be described in detail with reference to the accompanying drawings. A backwashing fluid discharge apparatus in accordance with the present invention is included in the filter unit, and thus will be described in conjunction with the description of the embodiments of the filter unit in accordance with the present invention.

Referring to FIGS. 3 and 4, the filter unit 1 in accordance with the present invention serves to perform a filtering process of removing foreign substances from a fluid by filtering the foreign substances present in the fluid. The filter unit 1 in accordance with the present invention may be installed in a ship. In this case, the filter unit 1 in accordance with the present invention may perform a filtering process of removing foreign substances from a fluid, such as seawater or fresh water, supplied to the ship so that ballast water, from which the foreign substances have been removed, is stored in a ballast tank in the ship.

The filter unit 1 in accordance with the present invention includes a main body 2, a filter member 3 installed in the main body 2, a filtering unit 4 (illustrated in FIG. 3) for performing a filtering process on a fluid, a backwash unit 5 (illustrated in FIG. 3) for performing a backwash process on the filter member 3, and a drainage device 6 coupled to the main body 2.

The filter member 3 may include a plurality of passage holes (see reference numeral 31 in FIG. 4) for passing the fluid. The filtering unit 4 moves the fluid from the inside of the filter member 3 to the outside of the filter member 3 through the passage holes 31. In this case, foreign substances mixed in the fluid cannot pass through the passage holes 31, but remain inside the filter member 3, whereby the process of filtering the fluid is performed.

The backwash unit 5 moves the fluid from the outside of the filter member 3 to the inside of the filter member 3. Thereby, the fluid moving from the outside of the filter member 3 to the inside of the filter member 3 separates the foreign substances from the filter member 3, whereby a backwash process for the filter member 3 is performed. The backwash fluid moved to the inside of the filter member 3 is discharged outward through a penetration opening 21 formed in the main body 2. The backwash fluid includes the fluid and the foreign substances separated from the filter member 3.

The drainage device 6 is coupled to the main body 2 so as to be located within the filter member 3. The drainage device 6 includes a plurality of inlet holes 61 to allow the backwash fluid to be introduced into the drainage device 6 and then be discharged through the penetration opening 21. The inlet holes 61 are formed at different heights so as to allow the backwash fluid to be introduced at the different heights. Here, the term "height" refers to the position on the basis of the direction in which the filter member 3 protrudes from the penetration opening 21 (i.e. the Z-axis, hereinafter referred to as a "height direction"). With this configuration, the inlet holes 61 are upwardly spaced apart from the penetration opening 21 in the height direction (the Z-axis). Accordingly, the filter unit 1 in accordance with the present invention may achieve the following operational effects.

First, the filter unit 1 in accordance with the present invention is configured to allow the backwash fluid to be introduced into the drainage device 6 through the inlet holes 61 at different heights, and thereafter to be discharged through the penetration opening 21. In this way, through the provision of the inlet holes 61 spaced apart from the penetration opening 21, the filter unit 1 in accordance with the present invention may mitigate a decrease in the magnitude of suction force, which is required to move the fluid from the outside of the filter member 3 to the inside of the filter member 3, and thus a decrease in the flow rate of the corresponding fluid even at the portion of the filter member 3 that is distant from the penetration opening 21. That is, the filter unit 1 in accordance with the present invention may mitigate a decrease in the force for the suction of the fluid, and thus a decrease in the flow rate of the corresponding fluid, occurring at the upper portion of the filter member 3 in the height direction (the Z-axis).

Accordingly, the filter unit 1 in accordance with the present invention may increase the efficiency of backwashing of the filter member 3 by increasing the uniformity of the suction force, which is required to perform the backwash process in the height direction (the Z-axis), as well as the uniformity of the flow rate of the corresponding fluid. In addition, the filter unit 1 in accordance with the present invention may have enhanced filtering performance by preventing the foreign substances from remaining adhered to the upper portion of the filter member 3 after the backwash process is performed.

Second, owing to increasing the efficiency of backwashing of the filter member 3, the filter unit 1 in accordance with the present invention may extend the maintenance and repair period for the replacement of the filter member 3, which is required because the passage holes 31 in the filter member 3 are clogged by the foreign substances. Accordingly, the filter unit 1 in accordance with the present invention may reduce, for example, the replacement cost for the filter member 3, thereby reducing management costs.

Third, owing to the increased uniformity of the suction force, which is required to perform the backwash process in the height direction (the Z-axis), as well as the increased uniformity of the flow rate of the corresponding fluid, the filter unit 1 in accordance with the present invention may reduce the flow rate of the fluid, which is consumed in order to perform the backwash process for the filter member 3, as well as the time taken to perform the backwash process for the filter member 3.

Hereinafter, the main body 2, the filter member 3, the filtering unit 4, the backwash unit 5, and the drainage device 6 will be described in detail with reference to the accompanying drawings.

Referring to FIGS. 3 and 4, the main body 2 supports the filter member 3. A plurality of filter members 3 may be installed in the main body 2. In this case, the filter members 3 are coupled to the main body 2 so as to be spaced apart from one another.

The main body 2 includes the penetration opening 21. The filter member 3 is coupled to the main body 2 so as to be connected to the penetration opening 21. The penetration opening 21 functions as a passage, through which the fluid moves during the implementation of the filtering process and the backwash process.

When the filtering process is performed, the fluid is supplied into the main body 2, and thereafter, moves to the inside of the filter member 3 by passing through the penetration opening 21. The fluid having passed through the penetration opening 21 may pass through the drainage device 6 to thereby move to the inside of the filter member 3. The fluid moved to the inside of the filter member 3 moves to the outside of the filter member 3 through the passage holes 31. During this movement of the fluid, the foreign substances mixed in the fluid cannot pass through the passage holes 31, but remain within the filter member 3, thereby being removed from the fluid. The fluid moved to the outside of the filter member 3 may be stored in the ballast tank, thus functioning as ballast water. In the case where a plurality of filter members 3 is coupled to the main body 2, the main body 2 may include the same number of penetration holes 21 as the number of filter members 3.

When the backwash process is performed, the fluid present within the main body 2 separates the foreign substances adhered to the inner surface of the filter member 3 from the filter member 3 while moving from the outside of the filter member 3 to the inside of the filter member 3 through the passage holes 31. The backwash fluid moved to the inside of the filter member 3 is discharged outward from the main body 2 by passing through the penetration opening 21. The backwash fluid moved to the inside of the filter member 3 may pass through the drainage device 6 so as to pass through the penetration opening 21, and thereafter, may be discharged outward from the main body 2. The backwash fluid may be a mixture of the fluid stored in the ballast tank and the foreign substances separated from the filter member 3.

The main body 2 may include a first main body 22 in which the filter member 3 is installed and a second main body 23 in which the backwash unit 5 is installed.

The first main body 22 supports the filter member 3. The first main body 22 is coupled to the second main body 23 so as to be located above the second main body 23. When the filtering process and the backwash process are performed, the inside of the first main body 22 may be filled with the fluid.

The first main body 22 may include a first connection member 221. When the filtering process and the backwash process are performed, the first connection member 221 functions as a passage, through which the fluid moves between the inside of the first main body 22 and the outside of the first main body 22. When the filtering process is performed, the fluid, from which the foreign substances have been removed by the filter member 3, may be discharged outward from the first main body 22 through the first connection member 221. When the backwash process is performed, the fluid outside the first main body 22 may be supplied to the inside of the first main body 22 through the first connection member 221. The first connection member 221 may be connected to the ballast tank via, for example, a pipeline. The filtering unit 4 may be installed between the first connection member 221 and the ballast tank.

The second main body 23 supports the first main body 22. When the filtering process is performed, the inside of the second main body 23 may be filled with the fluid. The second main body 23 may include a second connection member 231. When the filtering process is performed, the second connection member 231 functions as a passage, through which the fluid moves between the inside of the second main body 23 and the outside of the second main body 23. The second connection member 231 may be connected to, for example, a pipeline so as to allow seawater, fresh water or the like around the ship to be supplied to the inside of the second main body 23. The backwash unit 5 may be installed in the second main body 23. When the backwash process is performed, the inside of the second main body 23 may be filled with the fluid. The portion at which the second main body 23 and the first main body 22 are connected to each other, excluding the penetration opening 21, is closed in order to prevent the movement of the fluid.

Referring to FIGS. 3 and 4, the filter member 3 is coupled to the main body 2 so as to be located within the main body 2. The filter member 3 may be coupled to the first main body 22 so as to be located within the first main body 22. The filter member 3 removes the foreign substances from the fluid. To this end, the filter member 3 includes the passage holes 31 for passing the fluid. The passage holes 31 are formed to penetrate the filter member 3. The passage holes 31 may be formed in the filter member 3 such that they are spaced apart from one another. When the filtering process is performed, the fluid may move from the inside of the filter member 3 to the outside of the filter member 3 by passing through the passage holes 31. On the other hand, the foreign substances mixed in the fluid cannot pass through the passage holes 31, but are blocked by the filter member 3, thereby remaining within the filter member 3. Thereby, the filter member 3 may remove the foreign substances from the fluid.

The filter member 3 may be coupled to the main body 2 such that one end thereof is connected to the penetration opening 21. The filter member 3 may be coupled to the main body 2 such that the other end thereof comes into contact with the main body 2. The other end of the filter member 3 means the end opposite to the end of the filter member 3 that is connected to the penetration opening 21. The filter member 3 may have the overall form of a hollow cylinder. Although not illustrated, the filter member 3 may take the form of a truncated cone, the diameter of which is reduced upward in the height direction (the Z-axis). A plurality of filter members 3 may be coupled to the main body 2. In this case, the filter members 3 may be coupled to the main body 2 such that they are equidistantly spaced apart from one another.

Referring to FIGS. 3 and 4, the filtering unit 4 (illustrated in FIG. 4) moves the fluid from the inside of the filter member 3 to the outside of the filter member through the passage holes 31. Thereby, the filtering process is performed to remove the foreign substances from the fluid. The filtering unit 4 may include, for example, a pump for generating transportation force to move the fluid. The filtering unit 4 is coupled to the main body 2. The filtering unit 4 may be connected to the first connection member 221 of the first main body 22. Although not illustrated, the filtering unit 4 may be connected to the second connection member 231 of the second main body 23.

Referring to FIGS. 3 and 4, the backwash unit 5 moves the fluid from the outside of the filter member 3 to the inside of the filter member 3 through the passage holes 31. Thereby, the backwash process is performed to separate the foreign substances from the filter member 3. The backwash unit 5 is coupled to the main body 2. The backwash unit 5 may be coupled to the second main body 23.

The backwash unit 5 may include a rotation member 51, a connection member 52, and an operating member 53.

The rotation member 51 is rotatably coupled to the main body 2. The rotation member 51 may be coupled to the second main body 23 such that a portion thereof is inserted into the second main body 23 and a remaining portion thereof protrudes outward from the second main body 23. The rotation member 51 functions as a flow path, through which the backwash fluid supplied from the penetration opening 21 is discharged outward. The rotation member 51 may be a hollow pipe. The rotation member 51 may be rotated by a drive mechanism 54. The drive mechanism 54 may include, for example, a motor for generating the torque required to rotate the rotation member 51. The motor may be installed on the upper surface of the first main body 22. In this case, the drive mechanism 54 may further include a shaft for connecting the motor and the rotation member 51 to each other. The shaft may be coupled to the first main body 22 so as to penetrate the first main body 22, thereby connecting the motor and the rotation member 51 to each other. Although not illustrated, the motor may be installed underneath the second main body 23. In this case, the shaft may be coupled to the second main body 23 so as to penetrate the second main body 23.

The connection member 52 is coupled at one end thereof to the rotation member 51. As such, the connection member 52 may be rotated about the rotation member 51 as the rotation member 51 is rotated. The connection member 52 may be selectively connected at the other end thereof to the penetration opening 21 as it is rotated about the rotation member 51. When the other end of the connection member 52 is connected to the penetration opening 21, the backwash fluid may pass through the penetration opening 21 to thereby be supplied to the connection member 52, and thereafter may be supplied to the rotation member 51. The connection member 52 functions as a flow path for transmitting the backwash fluid supplied from the penetration opening 21 to the rotation member 51. The connection member 52 may be a hollow pipe. In the case where a plurality of filter members 3 is coupled to the main body 2, the connection member 52 may be selectively connected to the filter member 3, for which the backwash process is to be performed, among the filter members 3, based on the angle by which the rotation member 51 is rotated. Accordingly, the filter unit 1 in accordance with the present invention may perform the backwash process for the filter member 3 that is connected to the connection member 52, among the filter members 3, and simultaneously may perform the filtering process using another filter member 3 that is not connected to the connection member 52.

The operating member 53 is coupled to the rotation member 51. The operating member 53 may be coupled to the portion of the rotation member 51 that protrudes from the second main body 23. The operating member 53 may open or close the rotation member 51. In this case, the operating member 53 may include a valve for opening or closing the flow path of the rotation member 51, through which the backwash fluid moves. When the operating member 53 closes the rotation member 51, the backwash process is not performed even if the filter member 3 is connected to the connection member 52. When the operating member 53 opens the rotation member 51, the backwash process is performed on the filter member 3 connected to the connection member 52. In this case, the backwash process may be performed via the generation of transportation force required to move the fluid using the difference between the pressure of the inside of the first main body 22, which is filled with the fluid, and the pressure of the outside, which is connected to the inside via the rotation member 51. Although not illustrated, the operating member 53 may include, for example, a pump for generating the transportation force required to move the fluid.

Referring to FIGS. 3 and 4, the drainage device 6 is coupled to the main body 2 so as to be located within the filter member 3. The drainage device 6 may be coupled to the main body 2 such that one end thereof is connected to the penetration opening 21. The drainage device 6 may be coupled to the main body 2 such that the other end thereof is spaced apart from the main body 2 by a prescribed distance. The other end of the drainage device 6 means the end opposite to the end of the drainage device 6 that is connected to the penetration opening 21. The other end of the drainage device 6 is located higher than the end of the drainage device 6 that is connected to the penetration opening 21, on the basis of the height direction (the Z-axis). In the case where a plurality of filter members 3 is coupled to the main body 2, the filter unit 1 in accordance with the present invention may include the same number of drainage devices 6 as the number of filter members 3. The drainage devices 6 may be coupled to the main body 2 so as to be located within the respective filter members 3.

The drainage device 6 includes an inlet hole 61. The inlet hole 61 is upwardly spaced apart from the penetration opening 21 in the height direction (the Z-axis). As such, the drainage device 6 may distribute the suction force, supplied from the backwash unit 5, to the position upwardly spaced apart from the penetration opening 21 using the inlet hole 61. Accordingly, the drainage device 6 may mitigate a decrease in the magnitude of fluid suction force in the upper portion of the filter member 3 in the height direction (the Z-axis) as well as a decrease in the flow rate of the fluid by distributing and transmitting the suction force from the backwash unit 5 to the upper portion of the filter member 3 in the height direction (the Z-axis). In this way, the filter unit 1 in accordance with the present invention may increase the efficiency of backwashing of the filter member 3 by increasing the uniformity of the suction force, which is required in order to perform the backwash process in the height direction (the Z-axis) of the filter unit 1, as well as the uniformity of the flow rate of the corresponding fluid.

The drainage device 6 may include a plurality of inlet holes 61. The inlet holes 61 may be formed at different heights in the height direction (the Z-axis). As such, the drainage device 6 may distribute the suction force provided from the backwash unit 5 to a greater number of positions upwardly spaced apart from the penetration opening 21 through the inlet holes 61. In this way, the backwash fluid may be supplied to the inside of the drainage device 6 at different heights with the suction force transmitted through the inlet holes 61, and thereafter may move along the inside of the drainage device 6 to thereby be discharged through the penetration opening 21. Accordingly, the filter unit 1 in accordance with the present invention may achieve the increased uniformity of the suction force, which is required to perform the backwash process in the height direction (the Z-axis), as well as the uniformity of the flow rate of the corresponding fluid.

This can be appreciated from the results of measuring the flow rate of the fluid, moving from the outside of the filter member 3 to the inside of the filter member 3 through the passage holes 31 when performing the backwash process on each of the filter member 3, in which no drainage device 6 is installed, and the filter member 3 in which the drainage device 6 is installed. The graph of Comparative Example represented in FIG. 10 shows the measurement results for the filter member 3 in which no drainage device 6 is installed, and the graph of Example 1 represented in FIG. 10 shows the measurement results for the filter member 3 in which the drainage device 6 is installed.

In the graph of Comparative Example and the graph of Example 1, the vertical axis is the height of the filter member 3 and the horizontal axis is the flow rate of the fluid moving from the outside of the filter member 3 to the inside of the filter member 3. The lower end of the vertical axis corresponds to the portion of the filter member 3 that is close to the penetration opening 21, and, on the basis of the vertical axis, the point farther distant from the lower end corresponds to the portion of the filter member 3 that is upwardly spaced apart from the penetration opening 21 by a greater distance. On the basis of the horizontal axis, a bar having a longer left-right length represents a higher flow rate of fluid.

As illustrated in the graph of Comparative Example, the filter member 3 in which no drainage device 6 is installed shows a gradual reduction in the flow rate of the fluid with increasing distance from the lower end of the filter member 3. That is, the filter member 3 in which no drainage device 6 is installed exhibits a smaller fluid suction force in a higher portion thereof. Accordingly, it can be appreciated from the graph of Comparative Example that the filter member 3 in which no drainage device 6 is installed exhibits increased deterioration in the efficiency of backwashing in the portion of the filter member 3 that is spaced farther apart from the penetration opening 21.

On the other hand, as illustrated in the graph of Example 1, the filter member 3 in which the drainage device 6 is installed has an increased flow rate at vertical positions at which the inlet holes 61 are located. That is, the filter member 3 in which the drainage device 6 is installed includes the portions for exerting increased fluid suction force at the vertical positions at which the inlet holes 61 are located. Accordingly, it can be appreciated that the filter member 3 in which the drainage device 6 is installed may achieve increased backwashing efficiency by increasing the uniformity of the suction force, which is required to perform the backwash process in the height direction (the Z-axis) of the filter member 3, compared to the filter member 3 in which no drainage device 6 is installed.

Referring to FIGS. 3 to 5, the drainage device 6 may include a plurality of drainage members 62 for forming the inlet holes 61.

The respective drainage members 62 are coupled to the main body 2 so as to be located within the filter member 3. Each of the drainage members 62 is coupled to the main body 2 such that one end thereof is connected to the penetration opening 21. The main body 2 may include a support member (see reference numeral 24 in FIG. 5) for supporting one end of each drainage member 62. The support member 24 may be coupled to the first main body 22 so as to cross the penetration opening 21. As the drainage members 62 are coupled to the support member 24, one end of each drainage member 62 may remain connected to the penetration opening 21. Although FIG. 5 illustrates the support member 24 as having a cruciform shape, the present invention is not limited thereto, and the support member 24 may have any other shape so long as it can support the drainage members 62 while opening a portion of the penetration opening 21.

Each of the drainage members 62 is coupled to the main body 2 so that the other end thereof is upwardly spaced apart from the penetration opening 21. The drainage members 62 function as flow paths, along which the backwash fluid moves to the penetration opening 21. The drainage members 62 may be hollow pipes.

The drainage members 62 may have different diameters. As such, the drainage members 62 may be concentrically spaced apart from one another. Accordingly, the inlet holes 61 for the introduction of the backwash fluid are formed between the drainage members 62. In this way, the filter unit 1 in accordance with the present invention may implement the drainage device 6 having the inlet holes 61 without requiring a process of forming the inlet holes 61 in the drainage device 6. As a result, the filter unit 1 in accordance with the present invention may facilitate the manufacture of the drainage device 6 having the inlet holes 61 therein. In addition, the number of inlet holes 61 in the filter unit 1 in accordance with the present invention may be easily changed by changing the number of drainage members 62. Accordingly, the filter unit 1 in accordance with the present invention may be more versatile, by which it can be easily applied to products that require filter members 3 having various sizes and heights. The drainage device 6 may be implemented such that a drainage member 62 having a smaller diameter is located at an inwardly deep position. For example, the drainage device 6 may be implemented such that a drainage member 62 having a first diameter is located outside a drainage member having a second diameter, which is smaller than the first diameter.

The drainage members 62 may have different lengths in the height direction (the Z-axis). As such, on the basis of one ends of the drainage members 62 that are connected to the penetration opening 21, the drainage members 62 are coupled to the main body 2 such that the remaining ends of the drainage members 62 are located at different heights. Accordingly, the inlet holes 61 between the drainage members 62 are formed at different heights. In this way, the filter unit 1 in accordance with the present invention may facilitate the manufacture of the drainage device 6 having the inlet holes 61 spaced apart from one another in the height direction (the Z-axis). In addition, the filter unit 1 in accordance with the present invention may make it easy to change the heights of the inlet holes 61 by changing the lengths of the drainage members 62. As a result, the filter unit 1 in accordance with the present invention may be more versatile, by which it can be easily applied to products that require the filter member 3 to have various sizes and heights. The drainage device 6 may be implemented such that the drainage member 62 having a longer length is located at an inwardly deep position. For example, the drainage device 6 may be implemented such that a drainage member 62 having a first length is located outside a drainage member having a second length, which is smaller than the first length.

Referring to FIGS. 3 to 5, the drainage device 6 may include a first drainage member (see reference numeral 621 in FIG. 4) and a second drainage member (see reference numeral 622 in FIG. 4).

The first drainage member 621 is coupled to the main body 2 so as to be located within the filter member 3. The first drainage member 621 is coupled to the main body 2 such that one end thereof is connected to the penetration opening 21. The first drainage member 621 is coupled to the main body 2 such that the other end thereof is located at the position upwardly spaced apart from the penetration opening 21.

The first drainage member 621 includes a first insertion hole 6211. The first insertion hole 6211 is formed so as to penetrate the first drainage member 621. The first insertion hole 6211 may function as a flow path, along which the backwash fluid moves to the penetration opening 21. The first drainage member 621 may be a hollow pipe.

The second drainage member 622 is coupled to the main body 2 so as to be located within the first drainage member 621. The second drainage member 622 is coupled to the main body 2 such that one end thereof is connected to the penetration opening 21. The second drainage member 622 is coupled to the main body 2 such the other end thereof is located at the position upwardly spaced apart from the penetration opening 21.

The second drainage member 622 is installed so as to be located within the first drainage member 621 by being inserted into the first insertion hole 6211. In this case, the first insertion hole 6211 has a larger size than that of the second drainage member 622 so as to allow the second drainage member 622 to be installed within the first drainage member 621 and spaced apart from the first drainage member 621. When the first drainage member 621 and the second drainage member 622 have a cylindrical shape, the first insertion hole 6211 has a larger diameter than that of the second drainage member 622. The second drainage member 622 has a longer length than that of the first drainage member 621 such that the other end thereof protrudes upward from the first drainage member 621. As such, a first inlet hole (see reference numeral 611 in FIG. 4) for the introduction of the backwash fluid is formed between the first drainage member 621 and the second drainage member 622. The fluid, supplied into the first inlet hole 611, moves along the first insertion hole 6211, and thereafter is discharged through the penetration opening 21. The first inlet hole 611 may be formed at the same height as the other end of the first drainage member 621. That is, the first inlet hole 611 is formed at a vertical position that is upwardly spaced apart from the penetration opening 21.

Accordingly, the drainage device 6 may distribute the suction force provided from the backwash unit 5 to the vertical position at which the first inlet hole 611 is located. In this way, the drainage device 6 may increase the uniformity of the suction force, which is required to perform the backwash process in the height direction (the Z-axis) of the filter member 3, as well as the uniformity of the flow rate of the corresponding fluid by increasing the magnitude of fluid suction force that is applied to the portion of the filter member 3 that has the height corresponding to the first inlet hole 611 and to the flow rate of the fluid.

The second drainage member 622 includes a second insertion hole 6221. The second insertion hole 6221 is formed so as to penetrate the second drainage member 622. The second insertion hole 6221 may function as a flow path, along which the backwash fluid moves to the penetration opening 21. The second drainage member 622 may be a hollow pipe.

Referring to FIGS. 3 to 5, the drainage device 6 may further include a third drainage member (see reference numeral 623 in FIG. 4).

The third drainage member 623 is coupled to the main body 2 so as to be located within the second drainage member 622. The third drainage member 623 is coupled to the main body 2 such that one end thereof is connected to the penetration opening 21. The third drainage member 623 is coupled to the main body 2 such that the other end thereof is located at a vertical position that is upwardly spaced apart from the penetration opening 21.

The third drainage member 623 is installed so as to be located within the second drainage member 622 by being inserted into the second insertion hole 6221. In this case, the second insertion hole 6221 has a larger size than that of the third drainage member 623 so as to allow the third drainage member 623 to be installed within the second drainage member 622 and be spaced apart from the second drainage member 622. When the second drainage member 622 and the third drainage member 623 have a cylindrical shape, the second insertion hole 6221 has a larger diameter than that of the third drainage member 623. As such, a second inlet hole (see reference numeral 612 in FIG. 4) for the introduction of the backwash fluid is formed between the second drainage member 622 and the third drainage member 623. The fluid, supplied into the second inlet hole 612, moves along the second insertion hole 6221, and thereafter is discharged through the penetration opening 21. The second inlet hole 612 may be formed at the same height as the other end of the second drainage member 622. That is, the second inlet hole 612 is formed at a vertical position that is upwardly spaced apart from the first inlet hole 611. In this case, the first drainage member 621 may have a shorter length than the length of the second drainage member 622 so that the second inlet hole 612 is located higher than the first inlet hole 611.

Accordingly, the drainage device 6 may distribute the suction force provided from the backwash unit 5 to the height at which the first inlet hole 611 is located and the height at which the second inlet hole 612 is located. In this way, the drainage device 6 may increase the uniformity of the suction force, which is required to perform the backwash process in the height direction (the Z-axis) of the filter member 3, as well as the uniformity of the flow rate of the corresponding fluid by increasing the magnitude of fluid suction force that is applied to the portion of the filter member 3 that has the vertical position corresponding to the first inlet hole 611 and the portion of the filter member 3 that has the vertical position corresponding to the second inlet hole 612 and the flow rate of the fluid.

The third drainage member 623 may have a longer length than that of the second drainage member 622 such that the other end thereof protrudes upward from the second drainage member 622. The third drainage member 623 has a third insertion hole 6231. The third insertion hole 6231 is formed so as to penetrate the third drainage member 623. The third insertion hole 6231 may function as a flow path, along which the backwash fluid moves to the penetration opening 21. The third drainage member 623 may be a hollow pipe.

The third drainage member 623, the second drainage member 622, and the first drainage member 621 may be spaced apart from the filter member 3. That is, the drainage device 6 may be coupled to the main body 2 so as to be spaced apart from the filter member 3. As such, the backwash fluid, moved to the inside of the filter member 3 through the passage holes 31 located at the vertical positions corresponding to the second inlet hole 612, is divided and supplied to the second inlet hole 612 and the first inlet hole 611 as represented by the arrows in FIG. 4. That is, the second inlet hole 612 and the first inlet hole 611 are formed to share and move the backwash fluid, which has been moved into the filter member 3 through the passage holes 31, which are located at the vertical position corresponding to the second inlet hole 612, to the penetration opening 21.

In this way, the drainage device 6 may increase the area of the flow path, along which the backwash fluid, moved into the filter member 3 through the passage holes 31, moves to the penetration opening 21. As a result, the filter unit 1 in accordance with the present invention may increase the uniformity of the suction force, which is required to perform the backwash process in the height direction (the Z-axis) of the filter member 3, as well as the uniformity of the flow rate of the corresponding fluid, compared to the embodiment in which the drainage device 6 is coupled to the main body 2 so as to come into partial contact with the filter member 3.

This can be appreciated from the results of measuring the flow rate of the fluid moving from the outside of the filter member 3 to the inside of the filter member 3 through the passage holes 31 when performing the backwash process on each of the filter member 3, which is installed so as to come into partial contract with the drainage device 3, and the filter member 3, which is spaced apart from the drainage device 6.

The graph of Example 1 in FIG. 11 shows the measured results of an example in which the drainage device 6 comes into partial contact with the filter member 3 having a truncated conical shape. In Example 1, the respective drainage members 62 are installed such that the portions thereof in which the inlet holes 61 are formed come into contact with the inner surface of the filter member 3.

The graph of Example 2 in FIG. 11 shows the measured results of an example in which the drainage device 6 is spaced apart from the filter member 3 having a truncated conical shape. In Example 2, the respective drainage members 62 are installed such that the portions thereof in which the inlet holes 61 are formed are spaced apart from the filter member 3.

As illustrated in the graphs of FIG. 11, Example 2 in which the drainage device 6 is spaced apart from the filter member 3 shows an increased flow rate of fluid at the vertical positions at which the inlet holes 61 are located, compared to Example 1. That is, Example 2 shows an increased fluid suction force at the vertical positions at which the inlet holes 61 are located, compared to Example 1. Accordingly, it can be appreciated that the filter unit 1 in accordance with the present invention may increase the uniformity of the suction force, which is required to perform the backwash process in the height direction (the Z-axis), as well as the uniformity of the flow rate of the corresponding fluid, thereby achieving the increased efficiency of backwashing of the filter member 3 when the drainage device 6 is spaced apart from the filter member 3.

Referring to FIG. 6, the second inlet hole 612 may have a larger size than that of the first inlet hole 611. As the distance 612D between the second drainage member 622 and the third drainage member 623 is greater than the distance 611D between the first drainage member 621 and the second drainage member 622, the second inlet hole 612 may have a larger size than that of the first inlet hole 611. In this case, the difference between the diameters of the third drainage member 623 and the second drainage member 622 may be greater than the difference between the diameters of the second drainage member 622 and the first drainage member 621.

Accordingly, even if the suction force provided from the backwash unit 5 and distributed to the second inlet hole 612 is smaller than that distributed to the first inlet hole 611 because the second inlet hole 612 is spaced farther apart from the penetration hole 21 than the first inlet hole 611, the filter unit 1 in accordance with the present invention may compensate for this uneven distribution of the suction force by increasing the flow rate of the backwash fluid to be introduced into the second inlet hole 612. In this way, the filter unit 1 in accordance with the present invention may increase the uniformity of the suction force, which is required to perform the backwash process in the height direction (the Z-axis) of the filter member 3, as well as the uniformity of the flow rate of the corresponding fluid.

Referring to FIG. 6, the third drainage member 623 may be coupled to the main body 2 so as to protrude from the other end of the second drainage member 622 by a shorter distance 623L than the distance 622L by which the second drainage member 622 protrudes from the other end of the first drainage member 621. In this case, the difference between the lengths of the third drainage member 623 and the second drainage member 622 may be smaller than the difference between the lengths of the second drainage member 622 and the first drainage member 621.

Accordingly, even if the suction force provided from the backwash unit 5 and distributed to the second inlet hole 612 is smaller than that distributed to the first inlet hole 611 because the second inlet hole 612 is spaced farther apart from the penetration hole 21 than the first inlet hole 611, the filter unit 1 in accordance with the present invention may compensate for this uneven distribution of the suction force by reducing the size of the region for the introduction of backwash fluid into the second inlet hole 612 compared to the size of the region for the introduction of backwash fluid into the first inlet hole 611. In this way, the filter unit 1 in accordance with the present invention may increase the uniformity of the suction force, which is required to perform the backwash process in the height direction (the Z-axis) of the filter member 3, as well as the uniformity of the flow rate of the corresponding fluid.

Although the case where the drainage device 6 includes two or three drainage members 62 has been described above, the present invention is not limited thereto, and the drainage device 6 may include four or more drainage members 62. For example, the drainage device 6 may include six drainage members 62 as illustrated in FIG. 7. In this case, the drainage device 6 may have five inlet holes 61. Among the drainage members 62, the drainage member 62 that protrudes to the highest height in the height direction (the Z-axis) may be coupled to the main body (see reference numeral 2 in FIG. 3) so as to be spaced apart from the main body (see reference numeral 2 in FIG. 3) by a prescribed distance. Although not illustrated, the drainage member 62 that protrudes to the highest height in the height direction (the Z-axis) among the drainage members 62 may be coupled to the main body (see reference numeral 2 in FIG. 3) so as to come into contact with the main body (see reference numeral 2 in FIG. 3).

Referring to FIG. 8, the filter unit 1 in accordance with the present invention may further include a blocking unit 7.

The blocking unit 7 is coupled to the main body 2 so as to be located between the drainage device 6 and the filter member 3. The blocking unit 7 may be coupled to the support member (see reference numeral 24 in FIG. 5). The blocking unit 7 may block a portion of the penetration opening 21, thereby reducing the flow rate of backwash fluid, which is discharged to the penetration opening 21 by passing through the gap between the drainage device 6 and the filter member 3, rather than passing through the drainage device 6. This serves to prevent the unnecessary consumption of great suction force despite the fact that gap between the drainage device 6 and the filter member 3 is located close to the penetration opening 21, and thus the great suction force is not required to discharge the backwash fluid to the penetration opening 21.

Accordingly, the filter unit 1 in accordance with the present invention may increase the magnitude of the suction force that is distributed to the inlet holes 61 by reducing the amount of suction force that is consumed in order to discharge the backwash fluid to the penetration opening 21 through the gap between the drainage device 6 and the filter member 3. In this way, the filter unit 1 in accordance with the present invention may increase the uniformity of the suction force, which is required to perform the backwash process in the height direction (the Z-axis) of the filter member 3, as well as the uniformity of the flow rate of the corresponding fluid.

This can be appreciated from the results of measuring the flow rate of the fluid moving from the outside of the filter member 3 to the inside of the filter member 3 through the passage holes 31 when performing the backwash process on each of the filter member 3 in which no blocking unit 7 is installed and the filter member 3 in which the blocking unit 7 is installed.

The graph of Example 2 illustrated in FIG. 12 shows the measured results with regard to the filter member 3 in which no blocking unit 7 is installed. The graph of Example 3 illustrated in FIG. 12 shows the measured results with regard to the filter member 3 in which the blocking unit 7 is additionally installed, in contrast with Example 2.

As illustrated in the graphs of FIG. 12, it can be appreciated that Example 3 in which the blocking unit 7 is installed to block a portion of the penetration opening 21 may increase the uniformity of the suction force, which is required to perform the backwash process in the height direction (the Z-axis) of the filter member 3, as well as the uniformity of the flow rate of the corresponding fluid, compared to Example 2.

The blocking unit 7 may be coupled to the main body 2 so as to block a portion of the penetration opening 21 at a position between the outermost drainage member 62 among the drainage members 62 of the drainage device 6 and the filter member 3. For example, the blocking unit 7 may be coupled to the main body 2 so as to block a portion of the penetration opening 21 at a position between the first drainage member 621 and the filter member 3.

The blocking unit 7 may include a blocking member 71. The blocking member 71 may be coupled to the main body 2 such that one side thereof comes into contact with the inner surface of the filter member 3. The blocking member 71 may be coupled to the main body 2 such that the other side thereof is spaced apart from the first drainage member 621. The backwash fluid may be discharged to the penetration opening 21 through the gap between the other side of the blocking member 71 and the first drainage member 621. The blocking member 71 may have the overall form of a circular loop.

The blocking unit 7 may further include a protruding member 72. The protruding member 72 is formed so as to protrude upward from the other side of the blocking member 71. The protruding member 72 is spaced apart from the first drainage member 621 by a prescribed distance. As such, the backwash fluid, which has moved to the inside of the filter member 3 through the passage holes 31 located close to the penetration opening 21, may bypass the protruding member 72 to thereby be discharged to the penetration opening 21. Accordingly, the protruding member 72 may reduce the flow rate of the backwash fluid, which has moved to the inside of the filter member 3 through the passage holes 32 located close to the penetration opening 21, when the backwash fluid is discharged to the penetration opening 21, thereby increasing the uniformity of the suction force, which is required to perform the backwash process in the height direction (the Z-axis), as well as the uniformity of the flow rate of the corresponding fluid. The protruding member 72 may have the overall form of a hollow cylinder.

Referring to FIG. 9, the filter unit 1 in accordance with the present invention may further include a bypass member 8.

The bypass member 8 is installed in the main body 2. The filter member 3 is installed in the main body 2 so as to be located within the bypass member 8. That is, the bypass member 8 is installed in the main body 2 so as to surround the outer periphery of the filter member 3. To this end, the bypass member 8 may have an installation hole 81 for the installation of the filter member 3. The filter member 3 may be installed so as to be located within the bypass member 8 by being installed so as to be located in the installation hole 81. The installation hole 81 causes the upper end of the bypass member 8 to be opened. The installation hole 81 may be formed so as to penetrate the bypass member 8. The bypass member 8 may be formed so as to be located lower than the upper end of the filter member 3. As such, the filter member 3 is installed in the main body 2 so as to protrude from the bypass member 8.

Owing to the provision of the bypass member 8, the filter unit 1 in accordance with the present invention is implemented so as to supply the fluid to the filter member 3 by moving the fluid around the bypass member 8. As such, the filter unit 1 in accordance with the present invention may mitigate a decrease in the suction force, which is required to move the fluid from the outside of the filter member 3 to the inside of the filter member 3, as well as a decrease in the flow rate of the corresponding fluid even at the portion of the filter member 3 that is distant from the penetration opening 21. That is, the filter unit 1 in accordance with the present invention may further mitigate a decrease in the fluid suction force and the flow rate of the corresponding fluid even at the upper portion of the filter member 3 in the height direction (the Z-axis).

Accordingly, the filter unit 1 in accordance with the present invention may increase the efficiency of backwashing of the filter member 3 by increasing the uniformity of the suction force, which is required to perform the backwash process in the height direction (the Z-axis), as well as the uniformity of the flow rate of the corresponding fluid. In addition, the filter unit 1 in accordance with the present invention may prevent foreign substances from remaining adhered to the upper portion of the filter member 3 after the backwash process is performed, thereby improving the filtering performance.

Although the bypass member 8 may have the overall form of a cylinder having open upper and lower ends, the present invention is not limited thereto, and the bypass member 8 may have any other shape so long as it can bypass the fluid to be supplied to the filter member 3. In the case where the filter unit 1 in accordance with the present invention includes a plurality of filter members 3, the bypass member 8 may be provided in the number equal to the number of filter members 3. In this case, the filter members 3 may be located within the respective bypass members 8.

The present invention as described above are not limited to the above-described embodiments and the accompanying drawings and those skilled in the art will clearly appreciate that various modifications, deformations, and substitutions are possible without departing from the scope and spirit of the invention.

The invention claimed is:

1. A filter unit comprising:
   a filter member configured to remove foreign substance from a fluid;
   a main body including the filter member;
   a bypass member in the main body, wherein the filter member is in the bypass member, the bypass member has a first height, an upper end of the filter member has a second height, and the first height is lower than the second height;
   a filtering unit coupled to the main body, configured to move the fluid from inside the filter member to outside the filter member and remove the foreign substance from the fluid;
   a backwash unit coupled to the main body, configured to move backwash fluid from outside the filter member to inside the filter member and separate the foreign substance from the filter member; and
   a drainage device in the filter member and coupled to the main body,
   wherein the drainage device includes a plurality of inlet holes configured to introduce the backwash fluid, the inlet holes being configured to allow the backwash fluid inside the filter member to be discharged from the backwash unit through a penetration opening in the main body, and the inlet holes being located at different heights.

2. The filter unit according to claim 1, wherein the drainage device includes (i) a first drainage member in the filter member and coupled to the main body such that one end of the first drainage member is connected to the penetration opening, and (ii) a second drainage member in the first drainage member and coupled to the main body such that one end of the second drainage member is connected to the penetration opening,
   the first drainage member includes a first insertion hole configured for insertion of the second drainage member,
   the first insertion hole has a first diameter, the second drainage member has a second diameter, the first diameter is larger than the second diameter, the second drainage member is spaced apart from the first drainage member, and a first inlet hole configured to introduce the backwash fluid is between the second drainage member and the first drainage member, and
   the second drainage member has a first length, the first drainage member has a second length, the first length is longer than the second length, and a remaining end of the second drainage member protrudes from the first drainage member.

3. The filter unit according to claim 2, wherein the drainage device further includes a third drainage member in the second drainage member and coupled to the main body such that one end of the third drainage member is connected to the penetration opening,
   the second drainage member includes a second insertion hole configured for insertion of the third drainage member,
   the third drainage member has a third diameter, the second diameter is larger than the third diameter, the third drainage member is spaced apart from the second drainage member, and a second inlet hole configured to introduce the backwash fluid is between the third drainage member and the second drainage member, and
   the second inlet hole is higher than the first inlet hole.

4. The filter unit according to claim 3, wherein the third drainage member is spaced apart from the second drainage member by a larger distance than the second drainage member is spaced apart from the first drainage member.

5. The filter unit according to claim 3, wherein the third drainage member is coupled to the main body and protrudes from a remaining end of the second drainage member by a a first distance, the second drainage member protrudes from a remaining end of the first drainage member by a second distance, and the first distance is shorter than the second distance.

6. The filter unit according to claim 1, further comprising a blocking unit (i) coupled to the main body and (ii) between the drainage device and the filter member,
   wherein the blocking unit blocks a portion of the penetration opening in order to reduce a flow rate of the backwash fluid discharged through a gap in the penetration opening between the drainage device and the filter member.

7. A filter unit comprising:
   a filter member configured to remove a foreign substance from a fluid;
   a main body including the filter member;
   a bypass member in the main body, wherein the filter member is in the bypass member, the bypass member has a first height, an upper end of the filter member has a second height, and the first height is lower than the second height;

a backwash unit coupled to the main body configured to move backwash fluid from outside the filter member to inside the filter member and separate the foreign substance from the filter member; and a drainage device in the filter member and coupled to the main body, wherein the drainage device includes a plurality of drainage members coupled to the main body and configured to discharge the backwash fluid from inside the filter member, and the drainage members have different diameters, are spaced apart from one another, include a plurality of inlet holes configured to introduce the backwash fluid, and have different lengths such that the inlet holes are at different heights.

8. The filter unit according to claim 7, wherein the drainage device is coupled to the main body and spaced apart from the filter member.

9. The filter unit according to claim 1, wherein the backwash unit includes a rotation member through which the backwash fluid is discharged.

10. The filter unit according to claim 9, further comprising a drive mechanism configured to rotate the rotation member.

11. The filter unit according to claim 9, further comprising an operating member configured to open and close the rotation member.

12. A backwashing fluid discharge apparatus comprising:
a plurality of drainage members configured to be located within a filter member and to discharge backwash fluid from inside the filter member, and a blocking unit coupled to the main body and configured to be (i) between the drainage device and the filter member, (ii) block a portion of an opening between the drainage device and the filter member and (iii) reduce a flow rate of the backwash fluid discharged through the opening between the drainage device and the filter member, wherein the drainage members have different diameters and include a plurality of inlet holes configured to introduce the backwash fluid, and the drainage members have different lengths such that the inlet holes are at different heights.

13. The backwashing fluid discharge apparatus according to claim 12, wherein the drainage members include:
a first drainage member configured to be located within the filter member such that one end of the first drainage member is connected to the opening to discharge the backwash fluid; and a second drainage member configured to be located within the first drainage member such that one end of the second drainage member is connected to the penetration opening, wherein the second drainage member has a first length, the first drainage member has a second length, the first length is longer than the second length, and a remaining end of the second drainage member protrudes from the first drainage member, the first drainage member includes a first insertion hole configured for insertion of the second drainage member, and the first insertion hole has a first diameter, the second drainage member has a second diameter, the first diameter is larger than the second diameter, the second drainage member is spaced apart from the first drainage member, and a first inlet hole configured to introduce the backwash fluid is between the second drainage member and the first drainage member.

14. The backwashing fluid discharge apparatus according to claim 13, further comprising a third drainage member in the second drainage member such that one end of the third drainage member is connected to the opening, wherein the second drainage member includes a second insertion hole configured for insertion of the third drainage member, the third drainage member has a third diameter, the second diameter is larger than the third diameter, the third drainage member is spaced apart from the second drainage member, and a second inlet hole configured to introduce the backwash fluid is between the third drainage member and the second drainage member, and the second inlet hole is higher than the first inlet hole.

15. The backwashing fluid discharge apparatus according to claim 14, wherein the third drainage member is spaced apart from the second drainage member by a larger distance than the second drainage member is spaced apart from the first drainage member.

16. The backwashing fluid discharge apparatus according to claim 14, wherein the third drainage member protrudes from a remaining end of the second drainage member by a first distance, the second drainage member protrudes from a remaining end of the first drainage member by a second distance, and the first distance is shorter than the second distance.

17. The backwashing fluid discharge apparatus according to claim 12, wherein the respective drainage members are spaced apart from the filter member.

18. The backwashing fluid discharge apparatus according to claim 12, further comprising a bypass member in the main body, wherein the filter member is in the bypass member.

19. The backwashing fluid discharge apparatus according to claim 18, wherein the bypass member has a first height, an upper end of the filter member has a second height, and the first height is lower than the second height.

* * * * *